United States Patent [19]

Taylor et al.

[11] 4,432,821

[45] Feb. 21, 1984

[54] COMPOSITION AND METHOD FOR BRAZING GRAPHITE TO GRAPHITE

[75] Inventors: Albert J. Taylor, Ten Mile; Norman L. Dykes, Oak Ridge, both of Tenn.

[73] Assignee: The United States of America as represented by the United States Department of Energy, Washington, D.C.

[21] Appl. No.: 406,829

[22] Filed: Aug. 10, 1982

[51] Int. Cl.³ .................... C03B 29/00; C04B 33/34; C04B 37/00
[52] U.S. Cl. .................... 156/89; 156/325; 156/335; 428/408; 428/420; 524/301; 524/413; 524/430; 524/779; 524/783
[58] Field of Search .................... 156/89, 335, 325; 428/408, 420; 524/413, 430, 424, 361, 783, 779

[56] References Cited

U.S. PATENT DOCUMENTS

| | | | |
|---|---|---|---|
| 1,188,439 | 6/1916 | Goldsmith | 524/361 |
| 2,979,813 | 4/1961 | Steinberg | 228/121 |
| 2,979,814 | 4/1961 | Steinberg | 156/325 |
| 3,946,932 | 3/1976 | Peterson | 228/121 |

FOREIGN PATENT DOCUMENTS 116653 1/1959 U.S.S.R. .................... 156/335

*Primary Examiner*—David A. Simmons
*Assistant Examiner*—Timothy W. Heitbrink
*Attorney, Agent, or Firm*—Earl L. Larcher; Stephen D. Hamel; Richard G. Besha

[57] ABSTRACT

The present invention is directed to a brazing material for joining graphite structures that can be used at temperatures up to about 2800° C. The brazing material formed of a paste-like composition of hafnium carbide and uranium oxide with a thermosetting resin. The uranium oxide is converted to uranium dicarbide during the brazing operation and then the hafnium carbide and uranium dicarbide form a liquid phase at a temperature about 2600° C. with the uranium diffusing and vaporizing from the joint area as the temperature is increased to about 2800° C. so as to provide a brazed joint consisting essentially of hafnium carbide. This brazing temperature for hafnium carbide is considerably less than the eutectic temperature of hafnium carbide of about 3150° C. The brazing composition also incorporates the thermosetting resin so that during the brazing operation the graphite structures may be temporarily bonded together by thermosetting the resin so that machining of the structures to final dimensions may be completed prior to the completion of the brazing operation. The resulting brazed joint is chemically and thermally compatible with the graphite structures joined thereby and also provides a joint of sufficient integrity so as to at least correspond with the strength and other properties of the graphite.

7 Claims, No Drawings

COMPOSITION AND METHOD FOR BRAZING GRAPHITE TO GRAPHITE

This invention was made as a result of a contract with the United States Department of Energy.

BACKGROUND OF THE INVENTION

The present invention relates generally to joining graphite to graphite by brazing and, more particularly, to the brazing of graphite to graphite by employing a low-melting mixture of uranium carbide and hafnium carbide as the brazing material for producing a joint of essentially hafnium carbide.

Graphite has been found to provide a desirable structural material for use in high-temperature applications in both nuclear and nonnuclear technology. The thermal conductivity, thermal expansion and the high strength of graphite at elvated temperatures make this material particularly useful as a structural material for use in atomic vapor laser isotope separation processes. In the fabrication of the apparatus used for the laser isotope separation, relatively large structures of graphite with a high coefficient of thermal expansion are required. However, commercially available graphite articles are of insufficient size or of the wrong configurations required for the fabrication of certain components from single graphite structures. Consequently, the fabrication of graphite structures utilized in the apparatus for laser isotope separation processes necessitates the joining of graphite members or components so that a sufficiently large structure of graphite of the desired configuration can be provided for use in the fabrication of the laser isotope separation apparatus. Thermal compatibility of the graphite and the brazed joint together with resistance to the chemical attack at the joint area by uranium vapors or molten uranium are major concerns required in the fabrication of graphite by brazing.

Graphite has been previously joined together by using brazing processes. For example, in assignee's U.S. Pat. No. 3,946,932 which issued to George R. Peterson on Mar. 30, 1976, molybdenum powder is utilized as the brazing material. In this process, the molybdenum powder is placed between the fay surfaces of the graphite and converted to a carbide form with the addition of heat. The molybdenum diffused from the joint area during an annealing step to provide a joint consisting essentially of graphite. Another known process for joining graphite to graphite by brazing is the use of refractory metals as described in U.S. Pat. No. 2,979,813 issued to Morris A. Steinberg on Apr. 18, 1961. In the Steinberg patent, refractory metals such as elemental titanium, zirconium, hafnium, vanadium, niobium, tantalum, chromium, molybdenum, and tungsten are used as brazing materials. The brazing of the graphite structures was provided by placing a refractory metal in either the form of a solid layer or as a layer of powder intermediate the fay surfaces of the graphite pieces to be joined. The joint area was then heated to convert the refractory metal to carbide of the metal and then decompose carbide for permitting the volatilization of the carbide from the joint area to provide a joint consisting essentially of graphite.

While the brazing processes described in the aforementioned patents, especially the Steinberg patent, by using elemental metals as the brazing material provide satisfactory joints between graphite pieces some process conditions render the brazing operation somewhat impractical. For example, hafnium carbide has been found to be particularly suitable for use in the laser isotope separation program due to its wettability by molten uranium. However, the fabrication of brazed joints by using hafnium requires that the heating of the joint area be near the eutectic temperature of hafnium carbide which is about 3150° C. This fabrication of graphite parts requires the use of special furnaces and handling procedures to reach these high temperatures. A lower brazing temperature for joining graphite to graphite with hafnium carbide would be highly advantageous. Furnaces capable of 3000° C. are typically quite small or highly specialized such that they are unsuited as a general working furnace capable of handling large shapes for brazing.

SUMMARY OF THE INVENTION

It is the primary aim or objective of the present invention to provide a composition for use as a brazing material for joining graphite structures. This brazing composition is formed of a slurry of particulate uranium oxide, hafnium carbide, and a thermosetting resin. The composition when applied to graphite and subjected to sufficient temperature provides a low-melting composition of hafnium carbide and uranium dicarbide with the uranium dicarbide forming by a carbiding reaction with the graphite or the free carbon in the resin when carbonized. In using the composition as a brazing material, the slurry admixture of uranium oxide and hafnium carbide with the thermosetting resin is placed intermediate fay surfaces of the graphite structures to be joined. The joined area is then heated to a temperature sufficient to thermoset the resin. The joint area is then heated to a temperature adequate to effect the conversion of the uranium oxide to uranium dicarbide. The temperature is then further increased to a final temperature of about 2800° C. to sequentially form a liquid phase of the uranium dicarbide and hafnium carbide at a temperature of about 2600° C. and then effect the diffusion and vaporization of the uranium from the liquid phase as the temperature increases to provide a bond of essentially hafnium carbide between the graphite structures at the temperature of about 2800° C.

The uranium dicarbide provides a fugitive phase since it diffuses and vaporizes from the bond area so as to provide a brazed joint of essentially hafnium carbide. The utilization of the uranium dicarbide together with the hafnium carbide provides a low-melting composition having a liquid phase considerably less than the eutectic temperature of about 3150° C. for hafnium carbide thus providing a brazing temperature considerably less than that would be utilized for hafnium carbide as the brazing material.

Other and further objects of the invention will be obvious upon an understanding of the illustrative embodiments about to be described or will be indicated in the appended claims, and various advantages not referred to herein will occur to one skilled in the art upon employment of the invention in practice.

DESCRIPTION OF THE INVENTION

The present invention is directed to a brazing composition for joining graphite structures that is thermally compatible with the graphite and resistant to chemical attack. The coating composition of the present invention is formed of a uranium compound, hafnium carbide and a thermosetting resin. The blend of the desired amount of hafnium carbide powder with the powdered uranium compound is in a diluent containing a thermosetting resin. This slurry-like compound is placed on the fay surfaces of the graphite structure and the structure is then assembled into a desired configuration. The joint area is then heated to form a temporary bond by thermosetting the resin. The temporarily joined structure may be machined or otherwise finished to the desired final configurations. Upon completion of the machining or finishing operation, sufficient heat is applied to the surface or to the joint area to convert the uranium compound to uranium dicarbide. Additional heating to a temperature of about 2600° C. forms a solution of hafnium carbide and uranium dicarbide which melts at a low temperature as compared to hafnium carbide. Additional heat applied to the joint area, to about 2800° C., disperses the uranium dicarbide from the solution with the uranium both diffusing into the graphite adjacent to the joint area and vaporizing so as to leave a brazed joint formed essentially of hafnium carbide bonding the fay surfaces of the graphite structures. The resulting bond is compatible with the thermal properties so that during temperature excursions the coefficient of expansion of the graphite does not detract from the strength of the brazed joint.

The combining of the hafnium carbide with the uranium compound, which is converted to uranium dicarbide, forms a solution having a melting point of about 2600° C. which is considerably less than that of hafnium carbide which has been previously used as a brazing material as mentioned in the aforementioned patent. The liquid phase of the composition provides for the consolidating and bonding of the hafnium carbide on the fay surfaces of the graphite structures and the uranium dicarbide functions as a fugitive phase since it diffuses and vaporizes from the bond area so as to leave essentially hafnium carbide as the joint-forming material.

In preparation of the brazing composition, the uranium is introduced into the mixture as uranium oxide, preferably uranium dioxide because of the availability and convenience in handling of the dioxide form of uranium. However, other forms of uranium oxides may be readily utilized in the present invention. This uranium dioxide is reduced to uranium dicarbide during a heating of the brazing mixture. This carbiding reaction of the uranium oxide is provided by the reaction of the uranium with the free carbon generated during the carbonization of the thermosetting resin and by reacting with some carbon in the graphite structures.

The thermosetting resin is utilized in the brazing mixture since it advantageously provides a temporary bond between the graphite structures at a temperature of approximately 150° C. A resulting freestanding assembly of graphite may then be finished to the desired final dimensions before the brazing operation so as to negate subsequent machining of the joint area. In the formulation of the brazing mixture, a volume ratio of about 2:1 of hafnium carbide to uranium oxide is preferred so as to provide the desired liquid phase at a temperature of about 2600° C.

The hafnium carbide and uranium dioxide are of a particle size in the range of about 100 to 325 mesh with the smaller particle size being preferred so as to provide for more intimate contact between the two materials. The resin component of the composition may be varied considerably in the range of about 20 to 35 vol.% without effecting the braze material with the greater amount of resin being utilized if extensive machining of the assembled, resin-bonded graphite composite is required.

Typically, the bonding composition contains a 2:1 ratio of hafnium carbide to uranium dioxide which is about 66.4 wt.% or 47.1 vol.% hafnium carbide, 28.7 wt.% or 23.5 vol.% of uranium dioxide, and about 4.9 wt.% or 29 vol.% phenolic resin. This quantity of resin is satisfactory for forming a thermoset resin bond between the graphite structures for effecting the desired machining and other finishing prior to the brazing operation. The phenolic resin may be utilized in the powdered form with acetone being added to the mixture for dissolving the resin and adjusting the consistency of the mixture to allow its ready application as a slurry to the fay surfaces of the graphite structures. Normally about 11 ml of acetone are added for about each 100 g of the powdered solids. Alternatively, a liquid thermosetting resin can be substituted for the powdered phenolic resins in the brazing composition.

In the utilization of the brazing composition of the present invention, the fay surfaces of the graphite structures to be joined are coated with the slurry of the brazing composition. The structures are then assembled with the fay surfaces in contact and held by appropriate jigs or the like. The assembly is then placed in an oven in air and heated to a temperature of about 150° C. for thermosetting the resin. The thermoset bond between the fay surfaces of the graphite structure provides a self-supporting assembly which may be readily finished to the desired shape and dimensions by conventional machining operations. Upon completing the machine operation, the assembly is placed in a suitable furnace under an inert atmosphere of argon or the like. The temperature of the furnace is increased to a temperature of about 2600° C. during which heating the uranium dioxide reacts with the carbon resulting from the carbonization of the thermosetting resin and with free carbon in the graphite to form uranium dicarbide. At approximately 2600° C., the mixture of hafnium carbide and uranium dicarbide forms a liquid phase with the quantity of this liquid phase being dependent upon the amount of uranium dicarbide present in the mixture. The heating operation is then continued to about 2800° C. during which the uranium diffuses into the graphite surrounding the joint area and vaporizes from the liquid phase so as to provide a brazed joint consisting essentially of hafnium carbide. Normally, the uranium becomes dispersed from the bond area by the diffusion and vaporization during the heating from the 2600° C. to 2800° C. so that no hold time is required once the 2800° C. temperature is attained for effecting the difusion or vaporization of the uranium from the joint area.

Upon completion of the brazing operation, the heating is terminated and the brazed assembly is cooled and removed from the furnace for utilization in the desired application. The brazed joint exhibits structural properties at least compatible with the graphite members so as to provide a brazed assembly which can be utilized in high temperature environments without undergoing deleterious destruction of the joint due to the thermal properties of the graphite. Further, the joint area is substantially resistant to chemical attack so as to minimize the degradation of the joint due to contact with uranium vapors or the like such as encountered during laser isotope separation operations.

While the invention described herein is primarily directed to the use of the subject composition as a brazing material, it has been found that this composition can be used as a graphite coating material for affording protection to the graphite from chemical attack such as encountered in uranium vapors in the laser isotope separation operation. Also, the coating provided by this composite decreases the porosity in the hafnium carbide in the joint area as well as the surrounding graphite so as to negate entrapment of uranium and chemical impurities which would be deleterious to the use of the graphite in the laser isotope separation operation. To provide the coating on the uranium articles, the composition may be prepared as above, or if desired, a water soluble organic such as carboxymethylcellulose may be substituted for the thermosetting resin. The quantity of liquid utilized is such as to permit the spraying or brushing of the composition onto the graphite surface. In providing the coating the liquid phase of the composition can be solidified in place by lowering the process temperature and minimizing the time for effecting the uranium diffusion and vaporization from the coating. The coating may be formed by heating the composite to 2700° C. and then immediately initiating the cooling step. The coating integrity is primarily dependent upon preventing significant dispersion of the uranium from the liquid phase of the composite. While the integrity of the coating is provided by the presence of uranium in the coating, surface temperature of the coating is limited to approximately 2000° C. so as to negate migration of uranium from the coating. However, this temperature is sufficient for operations where uranium vapors are present. The coatings are reasonably resistant to destruction during exposure to ambient environments so as to inhibit the oxidation of the uranium present in the coating. However, exposure of the coating to high humidity environments has been found to be deleterious to the coating integrity.

It will be seen that the subject invention provides a brazing composition useful for joining graphite structures at a temperature less than that previously attainable with the two-phase composite of hafnium carbide and uranium providing a liquid phase for brazing purposes at the lower temperatures. The coating, on the other hand, is a two-phase composite provided by hafnium carbide, and a hafnium-uranium-carbon compound. Further, the coating compositions provide a good substrate for subsequent coating operations with yttria and the like so that the graphite structures could readily be utilized in metallurgical processes containing molten uranium and uranium alloys without subjecting the graphite substrate to an attack or reaction which molten uranium or uranium alloys.

What is claimed is:

1. A graphite brazing and coating composition comprising a slurry of particulate uranium oxide, particulate hafnium carbide and a thermosetting resin, said composition being characterized by the uranium oxide being converted to uranium dicarbide at an elevated temperature, and being also converted at a higher temperature of about 2600° C. to a liquid phase of the uranium dicarbide and hafnium carbide.

2. The composition claimed in claim 1, wherein the uranium oxide is uranium dioxide.

3. The composition claimed in claim 1, wherein the uranium oxide and the hafnium carbide are in particulate form in a size range of about 100 to 325 mesh, and wherein the volume ratio of hafnium carbide to uranium oxide is about 2:1.

4. The composition claimed in claim 3 wherein the resin component is phenolic resin in an acetone diluent, and wherein the resin component provides about 20 to 35 vol.% of the composition.

5. A method for joining graphite structures by brazing comprising the steps of:
 placing a slurry comprising particulate uranium oxide, particulate hafnium carbide and a thermosetting resin intermediate the fay surfaces of the graphite structures to be joined;
 heating the joint area to a temperature adequate to effect the conversion of the uranium oxide to uranium dicarbide; and
 then raising the temperature of the joint area to a temperature of about 2800° C. to sequentially form a liquid phase of the uranium dicarbide and hafnium dicarbide at a temperature of about 2600° C. and then effect the diffusion and vaporization of the uranium from the liquid phase as the temperature increases to about 2600° C. to provide a brazed joint consisting essentially of hafnium carbide between the graphite structures.

6. The method claimed in claim 5, wherein the volume ratio of hafnium carbide to uranium oxide in the slurry is about 2:1.

7. The method claimed in claim 6, including the additional steps of heating the joint area to a temperature adequate to thermoset the resin and then finishing the joint area to desired final dimensions prior to the step of heating the joint area to convert the uranium oxide to uranium dicarbide.

* * * * *